(12) United States Patent
Hosseini et al.

(10) Patent No.: US 9,483,806 B2
(45) Date of Patent: Nov. 1, 2016

(54) AGGREGATING CONTENT RELATED TO A NOTABLE INDIVIDUAL

(71) Applicant: LinkedIn Corporation, Mountain View, CA (US)

(72) Inventors: Farid Hosseini, San Francisco, CA (US); Christina Allen, Mountain View, CA (US); Joyce Wang, Mountain View, CA (US); Ada Yu, Mountain View, CA (US)

(73) Assignee: LinkedIn Corporation, Mountain View, CA (US)

( * ) Notice: Subject to any disclaimer, the term of this patent is extended or adjusted under 35 U.S.C. 154(b) by 338 days.

(21) Appl. No.: 13/712,606

(22) Filed: Dec. 12, 2012

(65) Prior Publication Data

US 2014/0164416 A1 Jun. 12, 2014

(51) Int. Cl.
*G06F 17/30* (2006.01)
*G06Q 50/20* (2012.01)
*G06Q 30/02* (2012.01)

(52) U.S. Cl.
CPC ...... *G06Q 50/2053* (2013.01); *G06Q 30/0269* (2013.01)

(58) Field of Classification Search
CPC ...... G06Q 50/01; G06Q 30/02; G06Q 10/06; G06Q 10/00; G06Q 10/105; G06Q 50/2053; G06Q 30/0269; G06Q 10/10; G06Q 30/0241; G06Q 30/0277; G06Q 50/20; G06Q 30/0251; G06Q 30/0276; G06Q 10/063; G06F 17/3082; G06F 17/30864; G06F 17/30705; G06F 17/30958; G06F 17/30035

USPC .......................................................... 707/758
See application file for complete search history.

(56) References Cited

U.S. PATENT DOCUMENTS

| | | | | |
|---|---|---|---|---|
| 2006/0042483 | A1* | 3/2006 | Work | G06Q 10/00 101/91 |
| 2009/0144609 | A1* | 6/2009 | Liang | G06F 17/21 715/230 |
| 2009/0276209 | A1* | 11/2009 | Dane | G06F 17/271 704/9 |
| 2010/0179916 | A1* | 7/2010 | Johns | G06Q 50/01 705/319 |
| 2011/0022602 | A1* | 1/2011 | Luo | G06Q 10/10 707/748 |
| 2012/0150955 | A1* | 6/2012 | Tseng | H04L 51/22 709/204 |

* cited by examiner

*Primary Examiner* — Evan Aspinwall
(74) *Attorney, Agent, or Firm* — Park, Vaughan, Fleming & Dowler LLP

(57) ABSTRACT

During an analysis technique, a cohort of individuals is identified based on a set of attributes. Significance metrics for the individuals in the cohort are calculated based on profiles of the individuals and behaviors of the group of individuals, which includes the cohort, when interacting with the profiles. For example, a significance metric for a given individual may include a number of views of a profile of the given individual, by a group of individuals, during a time interval and/or a number of connection requests to the profile of the given individual, by the group of individuals, during the time interval. Based on the significance metrics, the subset of the individuals may be identified. This subset may include individuals that have achieved career milestones exceeding those of the other individuals in the cohort (e.g., notable individuals).

18 Claims, 7 Drawing Sheets

AGGREGATING CONTENT RELATED TO A NOTABLE INDIVIDUAL

BACKGROUND

1. Field

The described embodiments relate to techniques for aggregating information. More specifically, the described embodiments relate to techniques for aggregating information related to one or more notable individuals.

2. Related Art

People regularly make decisions that affect their lives. For example, prospective students may select an educational institution (such as a school, a college or a university) that they want to attend or a company where they would like to work. Using a school as an example, typically student decisions are based on characteristics or attributes of the school, such as: its overall ranking, tuition and/or the available fields of study.

As is the case with other types of decisions, the decisions of prospective students can be influenced by marketing campaigns. For example, a school may attempt to attract prospective students by highlighting successful alumni who have achieved one or more career milestones (and who are sometimes referred to as 'notable individuals').

However, it can be difficult for the school to implement such a marketing campaign if the successful alumni are not known in advance. In the absence of this information, marketing campaigns implemented by schools may be less effective, which can be frustrating for school administrators, and can significantly increase the expense for the school in attracting prospective students.

SUMMARY

The disclosed embodiments relate to a computer system that identifies a subset of individuals in a cohort of individuals, particularly notable individuals. During operation, the computer system calculates significance metrics for the individuals in the cohort based on attributes in profiles of the individuals and behaviors of a group of individuals, which includes the cohort, when interacting with the profiles. Then, the computer system identifies the subset of the individuals based on the significance metrics, where the individuals in the subset have achieved career milestones exceeding those of the other individuals in the cohort.

Note that the cohort may include individuals who match a set of attributes.

Moreover, the profiles may specify a social graph with nodes corresponding to entities (such as the attributes) and edges corresponding to connections between the entities corresponding to the nodes.

Furthermore, a significance metric for a given individual in the cohort may include: a number of views of a profile of the given individual, by the group of individuals, during a time interval; and/or a number of connection requests to the profile of the given individual, by the group of individuals, during the time interval.

Note that the significance metric for the given individual in the cohort may be based on attributes in the profile of the given individual. In some embodiments, the attributes include: seniority of the given individual at an organization; and/or a size of an organization associated with the given individual.

Additionally, the significance metrics may be calculated based on information obtained from information sources external to the profiles. For example, the information sources may include locations on a network (such as a web page or a website) associated with the individuals in the cohort. Note that a given location may be associated with an organization that includes a given individual in the cohort. Furthermore, the information sources may include entries in an online encyclopedia.

Another embodiment provides a method that includes at least some of the operations performed by the computer system.

Another embodiment provides a computer-program product for use with the computer system. This computer-program product includes instructions for at least some of the operations performed by the computer system.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Embodiments of a computer system, a technique for identifying a subset of individuals in a cohort of individuals, and a computer-program product (e.g., software) for use with the computer system are described. During this analysis technique, significance metrics for the individuals in the cohort are calculated based on attributes in profiles of the individuals and behaviors of a group of individuals, which includes the cohort, when interacting with the profiles. For example, a significance metric for a given individual may include a number of views of a profile of the given individual, by the group of individuals, during a time interval, and/or a number of connection requests to the profile of the given individual, by the group of individuals, during the time interval. Based on the significance metrics, the subset of the individuals may be identified. This subset may include individuals that have achieved career milestones exceeding those of the other individuals in the cohort (e.g., notable individuals).

By identifying the subset, the analysis technique may increase the effectiveness of marketing campaigns, such as recruiting or advertising efforts. As a consequence, the analysis technique may reduce the cost of the marketing campaigns, which may increase the satisfaction of users of the analysis technique and, thus, may increase the revenue and profitability of a provider of the analysis technique.

In the discussion that follows, an individual, a user or a recipient of the subset may include a person (for example, an existing customer, a new customer, a student, an employer, a supplier, a service provider, a vendor, a contractor, etc.). More generally, the analysis technique may be used by an organization, a business and/or a government agency. Furthermore, a 'business' should be understood to include: for-profit corporations, non-profit corporations, groups (or cohorts) of individuals, sole proprietorships, government agencies, partnerships, etc.

Figure 1:
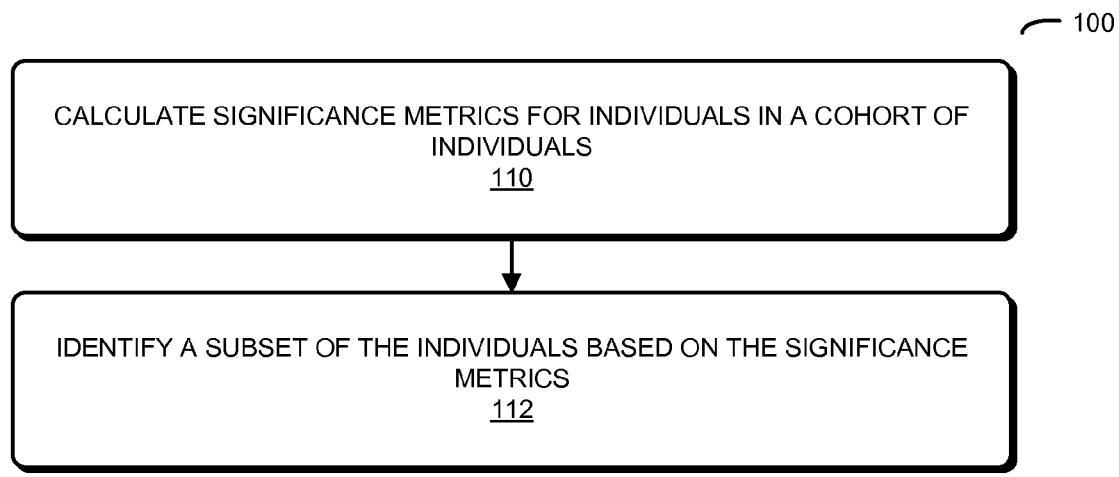
FIG. 1 is a flow chart illustrating a method for identifying a subset of individuals in a cohort of individuals in accordance with an embodiment of the present disclosure.

We now describe embodiments of the method. FIG. 1 presents a flow chart illustrating a method 100 for identifying a subset of individuals in a cohort of individuals, which may be performed by a computer system (such as computer system 600 in FIG. 6). During operation, the computer system calculates significance metrics for the individuals in the cohort (operation 110) based on attributes in profiles of the individuals and behaviors of a group of individuals, which includes the cohort, when interacting with the profiles. Then, the computer system identifies the subset of the individuals based on the significance metrics (operation 112), where the individuals in the subset have achieved career milestones exceeding those of the other individuals in the cohort.

Note that the cohort may include individuals who match a set of attributes.

Figure 4:
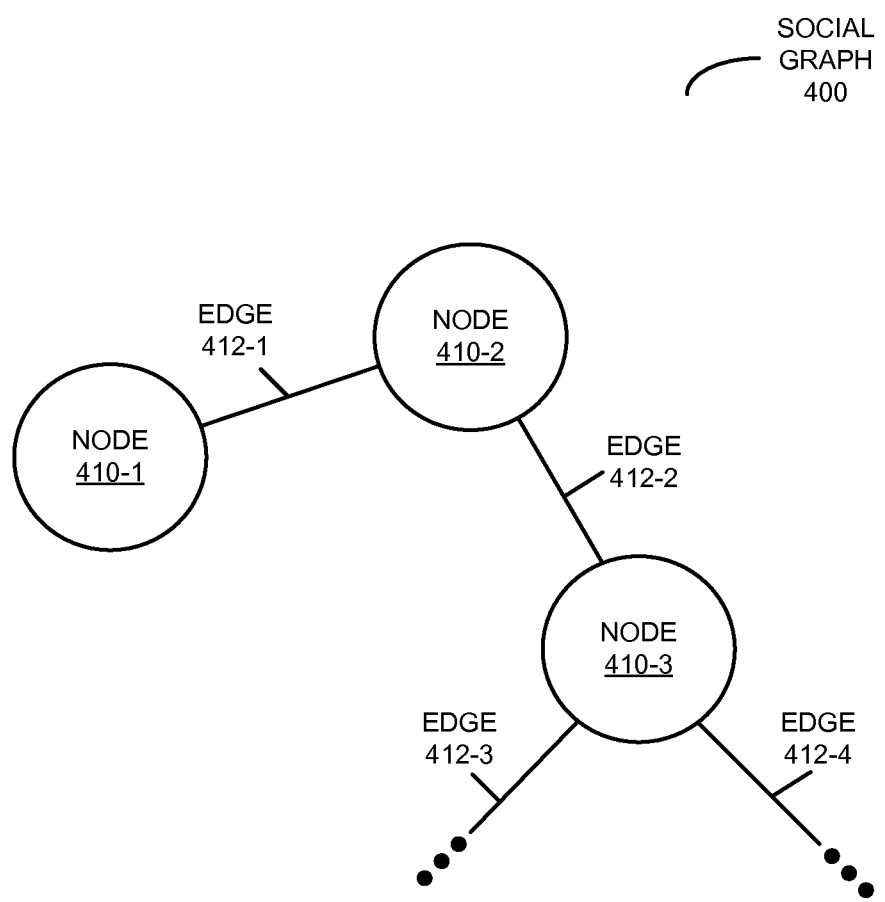
FIG. 4 is a drawing illustrating a social graph in accordance with an embodiment of the present disclosure.

Moreover, as described further below with reference to FIG. 4, the profiles may specify a social graph with nodes corresponding to entities (such as the attributes) and edges corresponding to connections between the entities corresponding to the nodes.

Furthermore, a significance metric for a given individual in the cohort may include a number of views of a profile of the given individual, by the group of individuals, during a time interval. Alternatively or additionally, a significance metric may include a number of connection requests to the profile of the given individual, by the group of individuals, during the time interval.

Note that the significance metric for the given individual in the cohort may be calculated based on attributes in the profile of the given individual. In some embodiments, the attributes include: seniority of the given individual at an organization and/or a size of an organization associated with the given individual.

Additionally, the significance metrics may be calculated based on information obtained from information sources external to the profiles. For example, the external information sources may include locations on a network (such as a web page or a website) associated with the individuals in the cohort. Note that a given location may be associated with an organization (such as a school or a company) that includes (or included) a given individual in the cohort. Furthermore, the information sources may include entries in an online encyclopedia, such as: schools they attended, a location where the given individual lives, an industry that they work in, etc. In some embodiments, the information may be scraped from the information sources by the computer system, and may be added to or aggregated into the profiles.

As described further below with reference to FIG. 4, in some embodiments the profiles specify a social graph associated with the cohort, where the social graph includes nodes corresponding to entities (such as the attributes) and edges corresponding to connections between the entities that correspond to the nodes. For example, an entity may include: a type of skill, a company where an individual worked or an organization that includes (or included) the individual, a school that the individual attended, etc.

Figure 2:
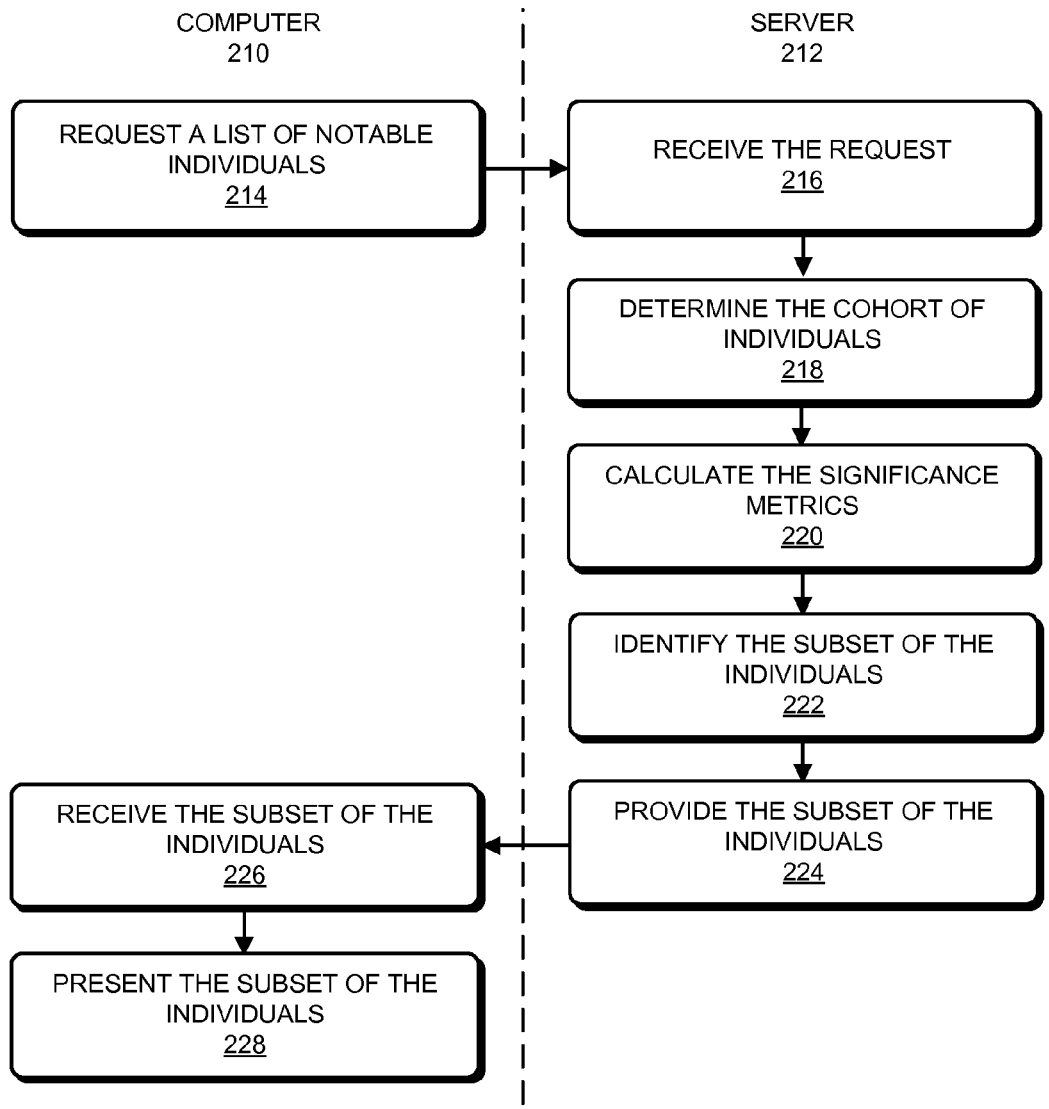
FIG. 2 is a flow chart further illustrating the method of FIG. 1 in accordance with an embodiment of the present disclosure.

In an exemplary embodiment, the analysis technique is implemented using a computer and at least one server, which communicate through a network, such as a cellular-telephone network and/or the Internet (e.g., using a client-server architecture). This is illustrated in FIG. 2, which presents a flow chart illustrating method 100 (FIG. 1). During this method, a user of computer 210 (such as an individual) may request, directly or indirectly (such as by explicitly entering the request or implicitly while using a software product or when interacting with a user interface), a list of notable individuals (operation 214), such as those that have achieved one or more career milestones and/or possess a particular set of personal and/or professional attributes.

Example career milestones may include a job title, an award and/or some other feat or attainment that may make the individuals noteworthy (such as executives, celebrities, public figures, authors, politicians, etc.). Moreover, example attributes may relate to an organization (e.g., a company, an educational institution, the government, the military), a field of study, etc.

After receiving this request (operation 216), server 212 may determine the cohort (operation 218) based on matches between career milestones and/or attributes specified in the request with the milestones and attributes in the profiles of individuals. Moreover, server 212 may calculate the significance metrics (operation 220) for the individuals in the cohort based on attributes in the profiles of the individuals and behaviors of a group of individuals, which includes the cohort, when interacting with the profiles. For example, the attributes may include the seniority of the given individual at an organization (i.e., how long they have been at or have been associated with the organization) and/or a size of an organization associated with the given individual. Thus, the significance metrics may be greater in magnitude for individuals in the cohort who have been at the organization the longest (e.g., more than 5 years) or who are associated with larger organizations (e.g., more than 50 employees). As noted previously, other significance metrics may include a number of views of a profile of the given individual during a time interval and/or a number of connection requests to the profile of the given individual during the time interval. In addition, the significance metrics may be calculated based on information obtained from information sources external to the profiles, such as: an entry in an online encyclopedia for the given individual, a college web page or website, and/or information on web page or website for a social network.

Then, server 212 may identify the subset of the individuals (operation 222) based on the significance metrics, where the individuals in the subset have achieved the one or more career milestones exceeding those of the other individuals in the cohort. For example, the subset may include individuals having significance metrics that exceed one or more thresholds. In particular, if there are more than 50 views of the profile of the given individual per day and/or more than 10 connection requests to the profile of the given individual per day, the given individual may be included in the subset. Similarly, individuals at the highest levels of management at the largest organizations may be included in the subset.

Next, server 212 may provide the subset of the individuals (operation 224) (or information specifying the subset), which is received by computer 210 (operation 226). After receiving the subset of the individuals, computer 210 may present the subset of the individuals (operation 228) to the user.

In some embodiments of method 100 (FIGS. 1 and 2), there may be additional or fewer operations. Moreover, the order of the operations may be changed, and/or two or more operations may be combined into a single operation.

In an exemplary embodiment, the analysis technique is used to assist in identifying notable individuals, such as those who are successful, powerful and/or influential. For example, the initial cohort from which notable individuals may be identified may include individuals that attended a particular college in the last 10 years, and who live in a geographical region (such as the New York metropolitan area).

The individuals in the cohort may be ranked based on significance metrics that assess how notable they are. For example, if many individuals in the cohort or a larger group of individuals that includes the cohort (such as individuals who interact via a common social network) access a profile of an individual or request a connection to the profile of the individual (e.g., request entry into a local social network with the individual), the significance metric for this individual may be greater than those of other individuals in the cohort. In this way, the influence of the individual in the global social network of the group of individuals may be assessed.

Similarly, individuals who have obtained high stature or positions in an organization may be identified based on the attributes in their profiles and/or information obtained from information sources external to the profiles, such as locations (for example, web pages or websites) on a network (such as the Internet). For example, individuals who hold senior positions, who have seniority, who are associated with large organization (such as those that include more than 50 or 100 people), etc., may have larger significance metrics than other individuals in the cohort.

After determining the significance metrics (which may include one aggregate significance metric for each individual in the cohort), the subset of the individuals may be identified. For example, the significance metrics for the individuals in the cohort may be compared to a threshold, such that the top 10% of the cohort is selected. In some embodiments, the significance metric for the given individual is a weighted summation of contributions from attributes in their profiles, behaviors of the group of individuals and/or information obtained from the external information sources. If this weighted summation is normalized to one, the threshold may be between 0.9 and 0.99.

Figure 3:
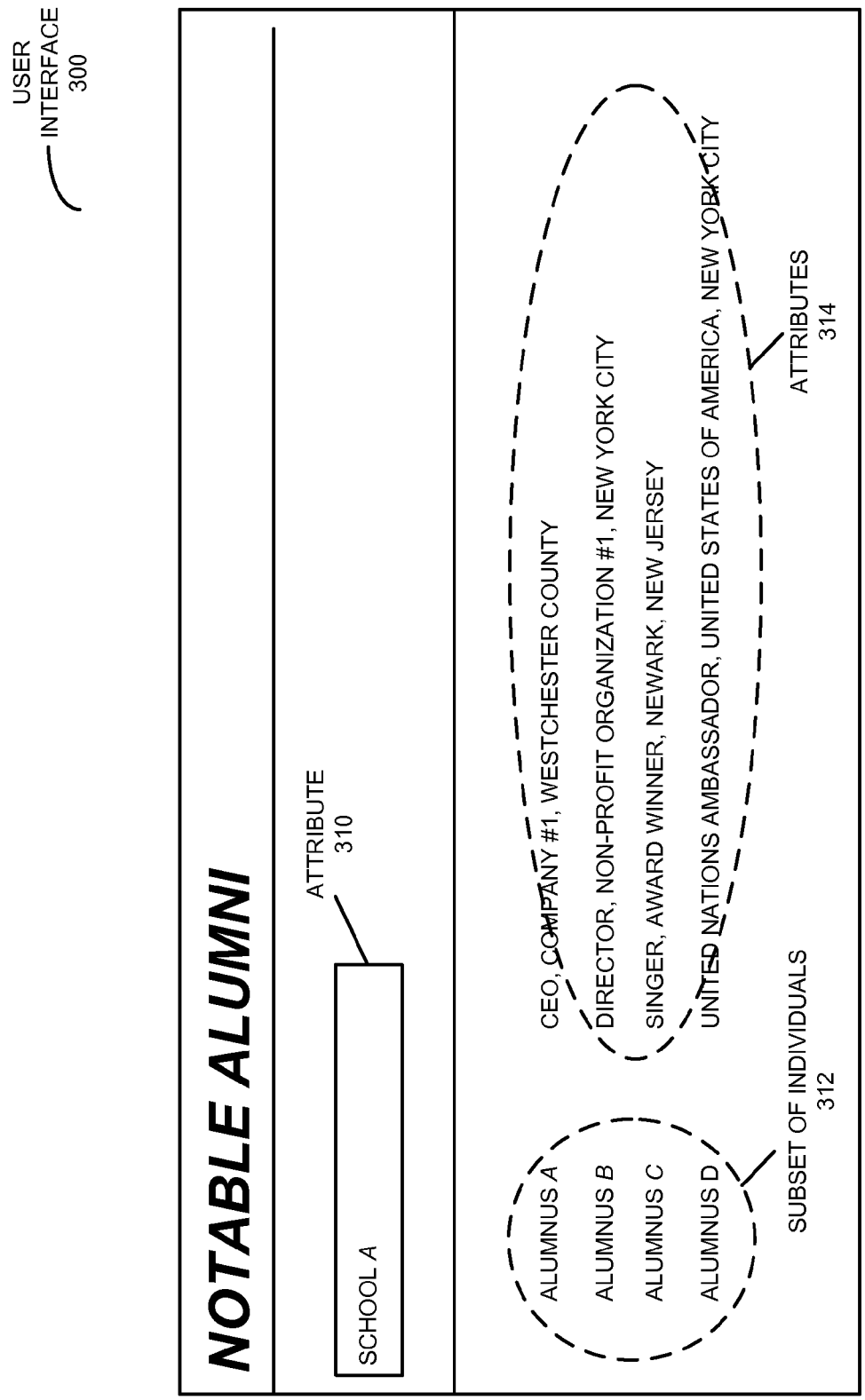
FIG. 3 is a drawing illustrating a user interface for identifying a subset of individuals in a cohort of individuals in accordance with an embodiment of the present disclosure.

Then, the members of this subset, as well as key attributes from their profiles or in the information obtained from the external information sources, may be presented to one or more individuals (such as a user of the analysis technique). For example, the top-N (such as the top-5 or the top-10) in the subset may be presented. This is shown in FIG. 3, which presents a drawing illustrating a user interface 300 for presenting the identified subset of individuals. In particular, as shown in FIG. 3, a user (such as a prospective student of a school) may use user interface 300 to specify at least one attribute 310 in a set of attributes, such as: an organization (such as a school, a college, a university, a company, etc.), a location, and/or a time interval (for example, the last 10 years).

In response, the analysis technique may: identify the cohort based on the set of attributes and profiles for the individuals, calculate the significance metrics, and select subset 312. This subset, along with attributes 314 (and/or the information obtained from the external information sources) of the individuals in subset 312, may be presented in user interface 300. For example, if the user of user interface 300 specifies graduates of a particular school in the last 10 years, the most-influential, successful and, more generally, notable alumni of the school may be presented. This information may be used, for example, by the school in recruiting efforts (for example, it may be presented to prospective students to influence their decision as to which educational institution they would like to attend). Therefore, attributes 314 may include: a company where a given individual works, their title, the year they graduated from the school, etc.

We now further describe the profiles of the cohort of individuals. As noted previously, the profiles may specify a social graph. FIG. 4 is a drawing illustrating a social graph 400. This social graph (which may correspond to a cohort of individuals) may represent the connections or interrelationships among nodes 410 (corresponding to entities) using edges 412. In the context of the analysis technique, the set of attributes may correspond to one or more of nodes 410, and individuals that match this set of attributes may correspond to some of the other nodes 410 connected to the set of attributes by edges 412. Moreover, additional attributes in the profiles of the individuals or information associated with the individuals may correspond to a remainder of nodes 410, which may be connected to other nodes by edges 412. In this way, social graph 400 may specify the cohort, and may indicate interrelationships (such as the attributes in the profiles of the individuals in the cohort), which may be used to calculate the significance metrics (and, thus, may be used to identify the subset).

Figure 5:
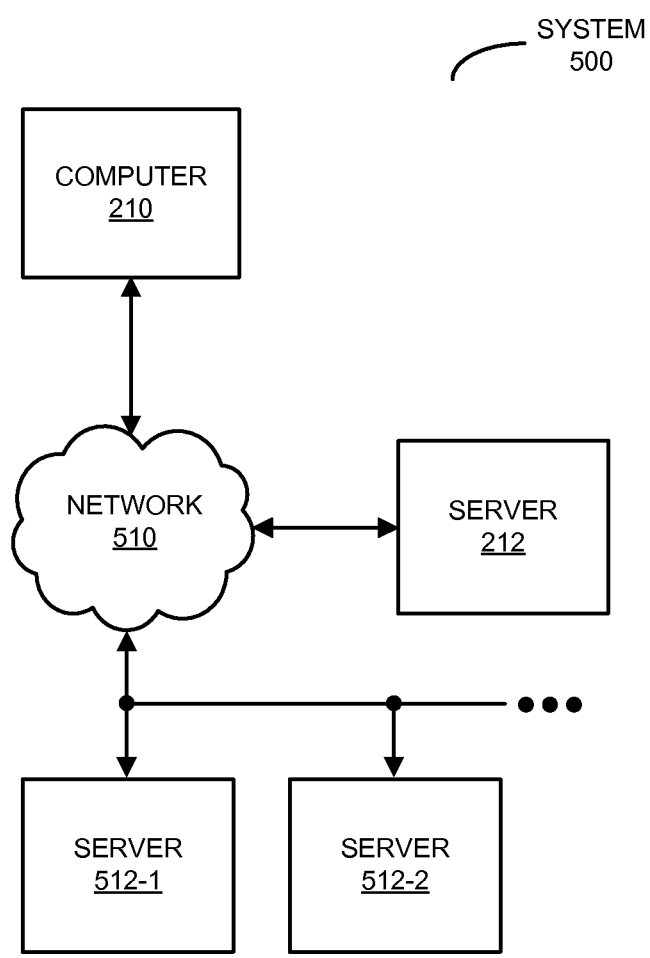
FIG. 5 is a block diagram illustrating a system that performs the method of FIGS. 1 and 2 in accordance with an embodiment of the present disclosure.

We now describe embodiments of the system and the computer system, and their use. FIG. 5 presents a block diagram illustrating a system 500 that performs method 100 (FIGS. 1 and 2). In this system, a user of computer 210 may use a software product, such as a software application that is resident on and that executes on computer 210.

Alternatively, the user may interact with a web page that is provided by server 212 via network 510, and which is rendered by a web browser on computer 210. For example, at least a portion of the software application may be an application tool that is embedded in the web page, and which executes in a virtual environment of the web browser. Thus, the application tool may be provided to the user via a client-server architecture.

The software application operated by the user may be a standalone application or a portion of another application that is resident on and which executes on computer 210 (such as a software application that is provided by server 212 or that is installed and which executes on computer 210).

As discussed previously, the user may use the software application to obtain the subset of individuals. This user may be a prospective student who is accessing profiles of individuals on a social network. In particular, the user may use the software product to specify the set of attributes. This information may be conveyed to server 212 via network 510. In response, server 212 may determine the cohort, may calculate the significance metrics for the individuals in the cohort, and may select the subset. Then, server 212 may provide the subset to computer 210 via network 510, and computer 210 may present this information to the user (for example, the subset may be displayed on a display).

In some embodiments, server 212 may access external information sources other than the profiles, such as servers 512 that include information specifying web pages or websites about the individuals in the cohort (such as school websites or entries in an online encyclopedia).

Note that information in system 500 may be stored at one or more locations in system 500 (i.e., locally or remotely). Moreover, because this data may be sensitive in nature, it may be encrypted. For example, stored data and/or data communicated via network 510 may be encrypted.

Figure 6:
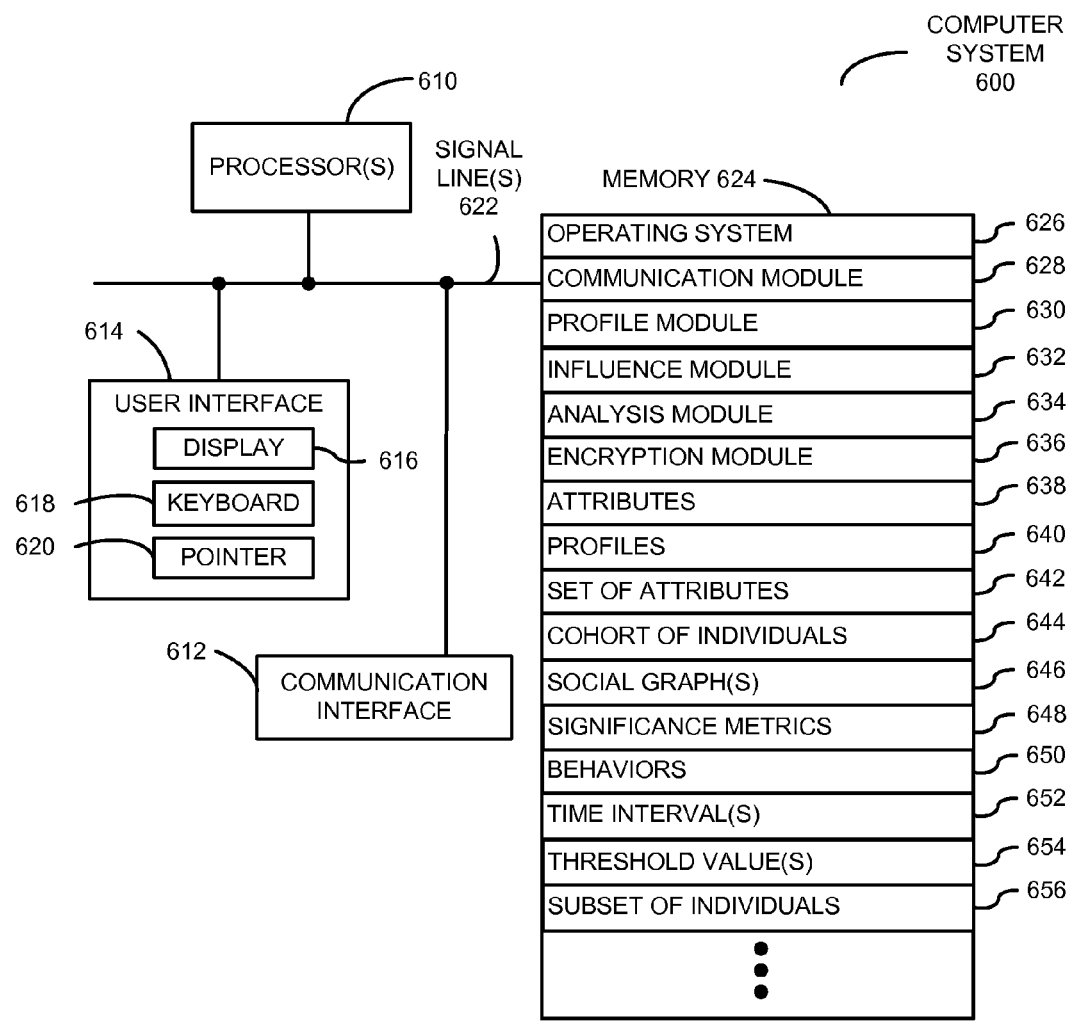
FIG. 6 is a block diagram illustrating a computer system that performs the method of FIGS. 1 and 2 in accordance with an embodiment of the present disclosure.

FIG. 6 presents a block diagram illustrating a computer system 600 that performs method 100 (FIGS. 1 and 2). Computer system 600 includes one or more processing units or processors 610, a communication interface 612, a user interface 614, and one or more signal lines 622 coupling these components together. Note that the one or more processors 610 may support parallel processing and/or multi-threaded operation, the communication interface 612 may have a persistent communication connection, and the one or more signal lines 622 may constitute a communication bus. Moreover, the user interface 614 may include: a display 616 (such as a touchscreen), a keyboard 618, and/or a pointer 620, such as a mouse.

Memory 624 in computer system 600 may include volatile memory and/or non-volatile memory. More specifically, memory 624 may include: ROM, RAM, EPROM, EEPROM, flash memory, one or more smart cards, one or more magnetic disc storage devices, and/or one or more optical storage devices. Memory 624 may store an operating system 626 that includes procedures (or a set of instructions) for handling various basic system services for performing hardware-dependent tasks. Memory 624 may also store procedures (or a set of instructions) in a communication module 628. These communication procedures may be used for communicating with one or more computers and/or servers, including computers and/or servers that are remotely located with respect to computer system 600.

Memory 624 may also include multiple program modules (or sets of instructions), including: profile module 630 (or a set of instructions), influence module 632 (or a set of instructions), analysis module 634 (or a set of instructions) and/or encryption module 636 (or a set of instructions). Note that one or more of these program modules (or sets of instructions) may constitute a computer-program mechanism.

During operation of computer system 600, profile module 630 may receive information from individuals (such as attributes 638, e.g., employment or educational history information) via communication interface 612 and communication module 628. In addition, profile module 630 may aggregate information about the individuals from external information sources (such as web pages or websites) via communication module 628 and communication interface 612. Note that profile module 630 may include this information in profiles 640 that correspond to the individuals.

Subsequently, influence module 632 may receive a set of attributes 642 from a user (such as a prospective student) via communication interface 612 and communication module 628. After set of attributes 642 is received, analysis module 634 may use the information in profiles 640 to identify cohort of individuals 644 based on set of attributes 642. Furthermore, analysis module 634 may use attributes 638 in profiles 640 to generate one or more social graphs 646. These social graphs may be included in a data structure.

Figure 7:
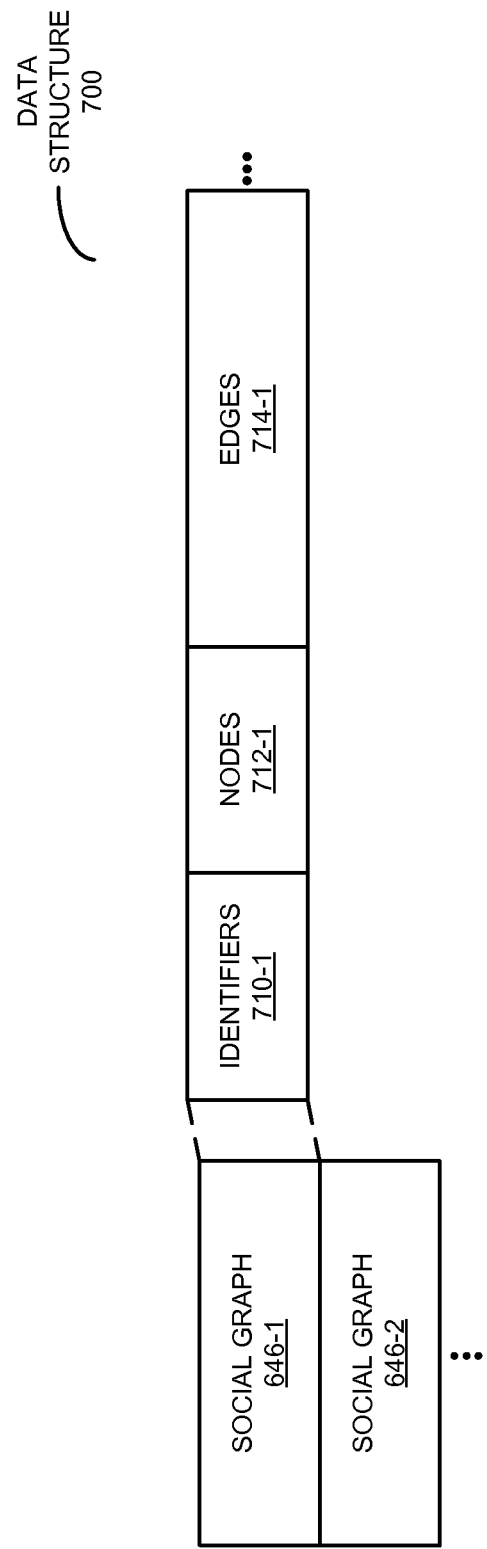
FIG. 7 is a block diagram illustrating a data structure for use in the computer system of FIG. 6 in accordance with an embodiment of the present disclosure.

This is shown in FIG. 7, which presents a block diagram illustrating a data structure 700 with one or more social graphs 646 for use in computer system 600 (FIG. 6). In particular, social graph 646-1 may include: identifiers 710-1 for the individuals in cohort of individuals 644 (FIG. 6), nodes 712-1 (for associated attributes 638 in FIG. 6), and/or edges 714-1 that represent relationships or connections between nodes 712-1. For example, nodes 712-1 may include: skills, jobs, companies, schools, locations, etc. Thus, nodes 712-1 may include set of attributes 642 (FIG. 6), and a remainder of nodes 712-1 may represent attributes 638 (FIG. 6) that are related to set of attributes 642 (FIG. 6), as indicated by edges 714-1.

Referring back to FIG. 6, analysis module 634 may use the one or more social graphs 646 to determine significance metrics 648 of the cohort of individuals 644. In addition, analysis module 634 may use behaviors 650 of individuals (including those in the cohort of individuals 644) when interacting with profiles 640 (such as how often they view profiles 640 or make connection requests to profiles 640) during one or more time intervals 652 (such as an hour, a day or a week).

Based on significance metrics 648 and one or more threshold values 654, analysis module 634 may select subset of individuals 656 in the cohort of individuals 644, and this subset may be presented to the user. For example, influence module 632 may present the subset of individuals 656 on display 616. Alternatively, influence module 632 may provide the subset of individuals 656 to the user via communication module 628 and communication interface 612. In this way, the subset of individuals 656 may be presented to the user while the user is viewing or interacting with profiles 640.

While the preceding discussion illustrates the identification of the subset of individuals 656 in response to the user specifying the set of attributes 642 (i.e., in real time or near-real time), in other embodiments the analysis technique may pre-identify multiple subsets of individuals, so that the subset of individuals 656 is already available when the user specifies the set of attributes 642. This 'pre-calculating' of the subset of individuals 656 may be performed offline, and may significantly decrease the response time (i.e., the time needed to present the subset of individuals 656), thereby improving the satisfaction of the user.

Because information in computer system 600 may be sensitive in nature, in some embodiments at least some of the data stored in memory 624 and/or at least some of the data communicated using communication module 628 is encrypted using encryption module 636.

Instructions in the various modules in memory 624 may be implemented in: a high-level procedural language, an object-oriented programming language, and/or in an assembly or machine language. Note that the programming language may be compiled or interpreted, e.g., configurable or configured, to be executed by the one or more processors.

Although computer system 600 is illustrated as having a number of discrete items, FIG. 6 is intended to be a functional description of the various features that may be present in computer system 600 rather than a structural schematic of the embodiments described herein. In practice, and as recognized by those of ordinary skill in the art, the functions of computer system 600 may be distributed over a large number of servers or computers, with various groups of the servers or computers performing particular subsets of the functions. In some embodiments, some or all of the functionality of computer system 600 is implemented in one or more application-specific integrated circuits (ASICs) and/or one or more digital signal processors (DSPs).

Computer systems (such as computer system 600), as well as computers and servers in system 500 (FIG. 5) may include one of a variety of devices capable of manipulating computer-readable data or communicating such data between two or more computing systems over a network, including: a personal computer, a laptop computer, a tablet computer, a mainframe computer, a portable electronic device (such as a cellular phone or PDA), a server and/or a client computer (in a client-server architecture). Moreover, network 510 (FIG. 5) may include: the Internet, World Wide Web (WWW), an intranet, a cellular-telephone network, LAN, WAN, MAN, or a combination of networks, or other technology enabling communication between computing systems.

System 500 (FIG. 5), computer system 600 and/or data structure 700 (FIG. 7) may include fewer components or additional components. Moreover, two or more components may be combined into a single component, and/or a position of one or more components may be changed. In some embodiments, the functionality of system 500 (FIG. 5) and/or computer system 600 may be implemented more in hardware and less in software, or less in hardware and more in software, as is known in the art.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer-system-implemented method for identifying a subset of individuals in a cohort of individuals, the method comprising:

using the computer system, calculating significance metrics for the individuals in the cohort based on attributes in profiles of the individuals and behaviors of a group of individuals, which includes the cohort, when interacting with the profiles, wherein a significance metric for a given individual in the cohort includes a number of views of a profile of the given individual, by a group of individuals, during a time interval, wherein the cohort is identified by identifying successful individuals who have achieved one or more milestones, wherein the cohort is determined based on matches between career milestones specified in a request with attributes in profiles of the individuals; and identifying notable individuals by identifying the subset of the successful individuals in the cohort based on the significance metrics, wherein the individuals in the subset have achieved career milestones exceeding those of the other individuals in the cohort, wherein the subset includes individuals having significance metrics exceeding one or more threshold; and presenting the subset of the individuals to a user along with second attributes, wherein the second attributes comprise at least one of: a company where a given individual in the subset works, the given individual's title, and a year the given individual graduated from a school.

2. The method of claim 1, wherein the cohort includes individuals who match a set of attributes.

3. The method of claim 1, wherein the profiles specify a social graph with nodes corresponding to entities and edges corresponding to connections between the entities corresponding to the nodes.

4. The method of claim 1, wherein a significance metric for a given individual in the cohort includes a number of connection requests to a profile of the given individual, by a group of individuals, during a time interval.

5. The method of claim 1, wherein a significance metric for a given individual in the cohort is calculated based on attributes in a profile of the given individual.

6. The method of claim 5, wherein the attributes include at least one of: seniority of the given individual at an organization; and a size of an organization associated with the given individual.

7. The method of claim 1, wherein the significance metrics are further calculated based on information obtained from information sources external to the profiles.

8. The method of claim 7, wherein the information sources include locations on a network associated with the individuals in the cohort.

9. The method of claim 8, wherein a given location is associated with an organization that includes a given individual in the cohort.

10. The method of claim 7, wherein the information sources include entries in an online encyclopedia.

11. A computer-program product for use in conjunction with a computer, the computer-program product comprising a non-transitory computer-readable storage medium and a computer-program mechanism embedded therein, to identify a subset of individuals in a cohort of individuals, the computer-program mechanism including:

instructions for calculating significance metrics for the individuals in the cohort based on attributes in profiles of the individuals and behaviors of a group of individuals, which includes the cohort, when interacting with the profiles, wherein a significance metric for a given individual in the cohort includes a number of views of a profile of the given individual, by a group of individuals, during a time interval, wherein the cohort is identified by identifying successful individuals who have achieved one or more milestones, wherein the cohort is determined based on matches between career milestones specified in a request with attributes in profiles of the individuals;

instructions for identifying notable individuals, wherein identifying the notable individuals comprises identifying the subset of the successful individuals in the cohort based on the significance metrics, wherein the individuals in the subset have achieved career milestones exceeding those of the other individuals in the cohort, wherein the subset includes individuals having significance metrics exceeding one or more threshold; and instructions for presenting the subset of the individuals to a user along with second attributes, wherein the second attributes comprise at least one of: a company where a given individual in the subset works, the given individual's title, and a year the given individual graduated from a school.

12. The computer-program product of claim 11, wherein the cohort includes individuals who match a set of attributes.

13. The computer-program product of claim 11, wherein the profiles specify a social graph with nodes corresponding to entities and edges corresponding to connections between the entities corresponding to the nodes.

14. The computer-program product of claim 11, wherein a significance metric for a given individual in the cohort includes a number of connection requests to a profile of the given individual, by a group of individuals, during a time interval.

15. The computer-program product of claim 11, wherein a significance metric for a given individual in the cohort is calculated based on attributes in a profile of the given individual.

16. The computer-program product of claim 15, wherein the attributes include at least one of: seniority of the given individual at an organization; and a size of an organization associated with the given individual.

17. The computer-program product of claim 11, wherein the significance metrics are further calculated based on information obtained from information sources external to the profiles; and
wherein the information sources include at least one of: locations on a network associated with the individuals in the cohort; and entries in an online encyclopedia.

18. A computer, comprising:
a processor;
memory; and
a program module, wherein the program module is stored in the memory and configurable to be executed by the processor to identify a subset of individuals in a cohort of individuals, the program module including:
instructions for calculating significance metrics for the individuals in the cohort based on attributes in profiles of the individuals and behaviors of a group of individuals, which includes the cohort, when interacting with the profiles, wherein a significance metric for a given individual in the cohort includes a number of views of a profile of the given individual, by a group of individuals, during a time interval, wherein the cohort is identified by identifying successful individuals who have achieved one or more milestones, wherein the cohort is determined based on matches between career milestones specified in a request with attributes in profiles of the individuals;
instructions for identifying notable individuals, wherein identifying the notable individuals comprises identifying the subset of the successful individuals in the cohort based on the significance metrics, wherein the individuals in the subset have achieved career milestones exceeding those of the other individuals in the cohort, wherein the subset includes individuals having significance metrics exceeding one or more threshold; and
instructions for presenting the subset of the individuals to a user along with second attributes, wherein the second attributes comprise at least one of: a company where a given individual in the subset works, the given individual's title, and a year the given individual graduated from a school.

* * * * *